I. D. WALTER.
DEMOUNTABLE RIM FOR TIRES.
APPLICATION FILED SEPT. 13, 1916.
1,240,162.
Patented Sept. 11, 1917.
2 SHEETS—SHEET 1.
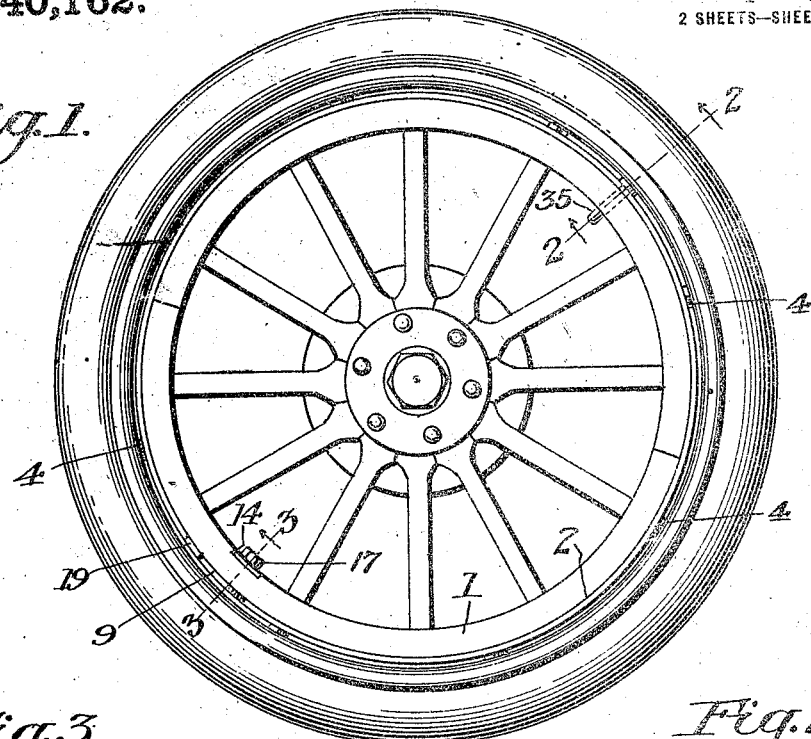
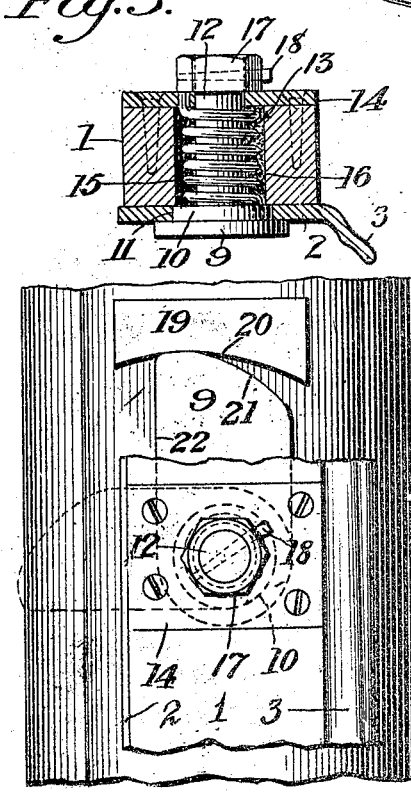
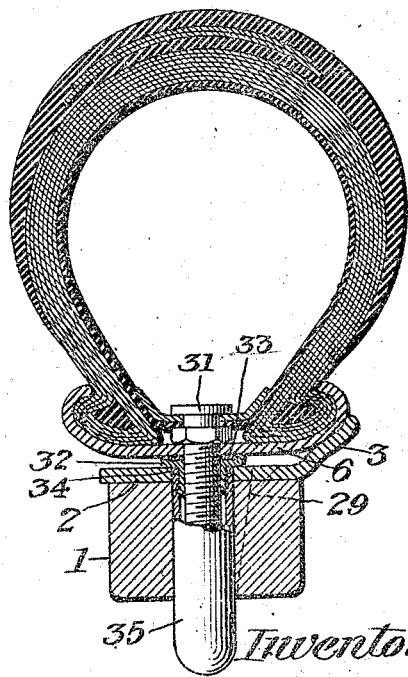
Inventor
Ira D. Walter I. D. WALTER.
DEMOUNTABLE RIM FOR TIRES.
APPLICATION FILED SEPT. 13, 1916.
1,240,162.
Patented Sept. 11, 1917.
2 SHEETS—SHEET 2.
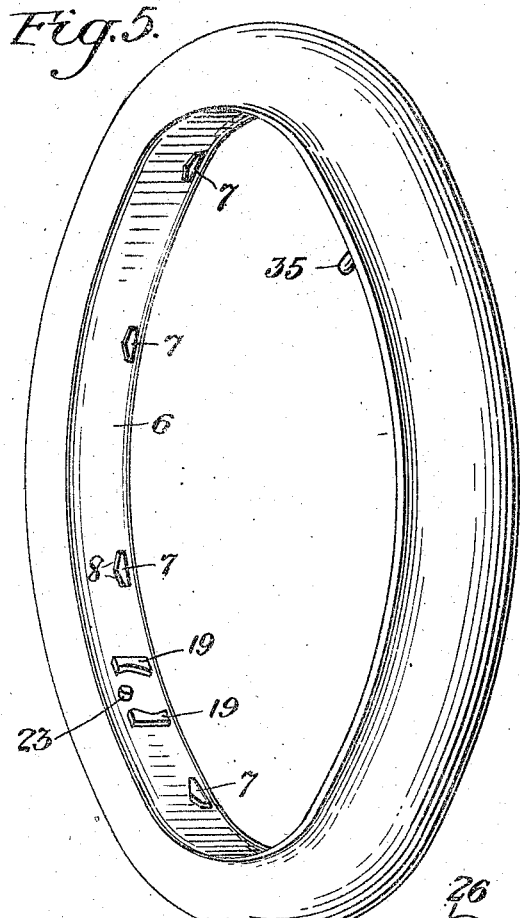
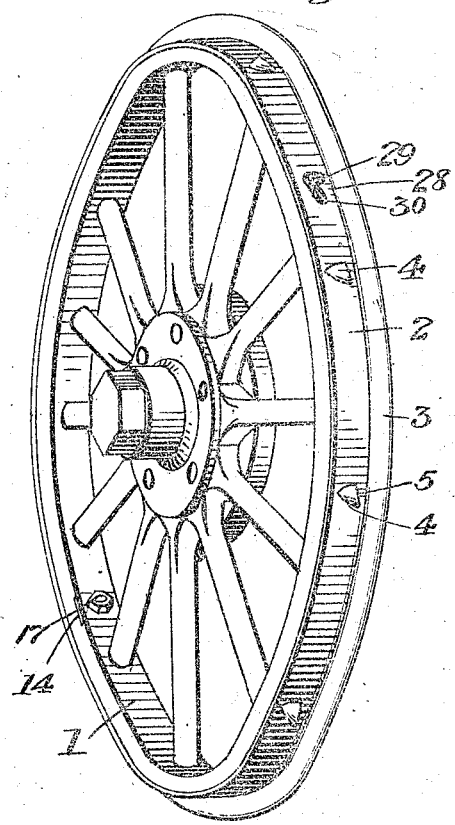
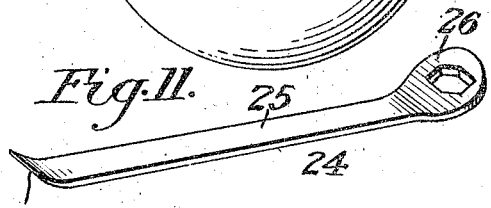
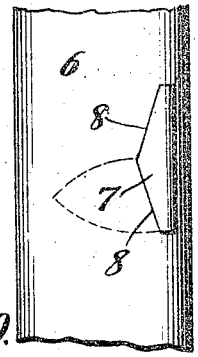
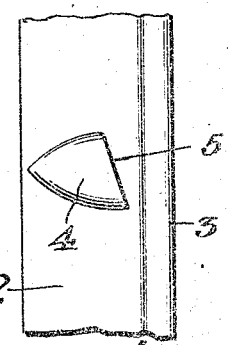
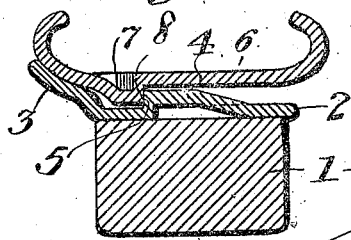
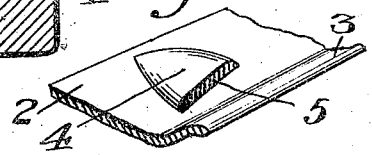
Inventor:
Ira D. Walter

UNITED STATES PATENT OFFICE.

IRA D. WALTER, OF HARRISBURG, ARKANSAS, ASSIGNOR OF ONE-TWENTIETH TO THOMAS FLOURNOY, ONE-TENTH TO BENJAMIN F. COLE, THIRTY-SIX ONE-HUNDREDTHS TO JOSIAH BRINKERHOFF, ONE-TWENTIETH TO JODIE G. GANT, AND ONE-FIFTIETH TO SAMUEL A. LATIMER, ALL OF HARRISBURG, ARKANSAS, ONE-TWENTIETH TO ED. HAMILTON AND ONE-TWENTIETH TO CLINTON B. BAILEY, BOTH OF WYNNE, ARKANSAS, ONE-TWENTIETH TO FRED SHAUVER AND HARVEY C. SHAUVER, BOTH OF NETTLETON, ARKANSAS, AND ONE-FIFTIETH TO JAMES W. GANT, OF HARRISBURG, ARKANSAS.

DEMOUNTABLE RIM FOR TIRES.

1,240,162.  Specification of Letters Patent.  Patented Sept. 11, 1917.

Application filed September 13, 1916. Serial No. 119,880.

*To all whom it may concern:*

Be it known that I, IRA D. WALTER, a citizen of the United States, residing at Harrisburg, in the county of Poinsett and State of Arkansas, have invented a certain new and useful Improvement in Demountable Rims for Tires, of which the following is a full, clear, and exact description.

My invention relates to demountable rims for use on automobile wheels, and it is particularly designed to facilitate the application, when necessary, of an extra or spare rim which is carried on the automobile and has an inflated tire. Inasmuch as the necessity for using the extra or spare rim almost always arises in an emergency, and when a service department is not readily accessible, it is obvious that a rim having the fewest parts and requiring the least expert knowledge in using it has many advantages, especially in comparison with well-known commercial types of rims, all of which are complicated in structure and slow and difficult of adjustment.

The present invention belongs to that type of rims in which the fastening means are a part of the outer rim itself and the felly band, and depending for engagement upon a slight circumferential movement of the demountable rim upon the felly band or other fixed rim of the wheel, as distinguished from the bolted-on type of demountable rims.

Various constructions of rims having the rim-securing means made as parts of the outer rim and the felly band have been proposed in which the rim-securing means are more or less complicated in design and operation, and consequently expensive to manufacture. In these constructions have been employed various systems of inclined wedging or channel lugs and plates, which require accurate fitting. The general tendency of the interlocking surfaces to become too tightly engaged by wedging and by rust render these rims more or less impractical and inoperative. Most, if not all, of these devices require some mechanical adjustment in order to be at all effective. Wear upon the rim parts would produce squeaking and rattling unless they were immovably joined together, or else readjustment of the locking devices is necessary. In no case is provision made for lubricating the locking devices, so as to secure proper wear and rust-resisting qualities.

Economy in construction, simplicity of design and operation, and facility in application both in mounting and demounting, are essentials still sought after in a commercially practical demountable rim.

The object of this invention is to materialize these, among other desired, features in a demountable rim construction, and avoid the use of all separate and extraneous rim-securing bolts, clamps, and other fasteners, such as are now commonly used, and to this end the present invention consists of a demountable rim having certain transverse lugs, with inclined radial shoulders to engage complemental transverse lugs on the felly band, which two sets of lugs coöperate to draw the rim laterally inward against an upstanding flange on the felly band with substantially constant pressures and yet without the possibility of the lugs becoming inert or escaping one another, thereby holding the demountable rim against lateral displacement, insuring its concentricity with the wheel and its lying in the vertical plane of the wheel; the circumferential placement of the tire being effected by a combined positioning and locking mechanism carried by the body of the wheel and acting upon an abutment on the rim, and the loosening of the rim for demounting purposes being effected by the reverse action of said mechanism on a fixed projection on the rim; and the invention also consists of other features, as I will proceed now to explain and finally claim.

In the accompanying drawings illustrating the invention, in the several figures of which like parts are similarly designated, Figure 1 is a front elevation of a complete pneumatic-tire wheel, with the demountable rim, the other views being on a larger scale. Fig. 2 is a cross-section, on line 2—2 of Fig. 1. Fig. 3 is a cross-section of the felly and felly band, on line 3—3 of Fig. 1, showing the combined positioning and locking mechanism in elevation. Fig. 4 is an inner plan view with the felly and felly band broken away and showing the combined positioning and locking mechanism in locking position in full lines and showing it in unlocked position in dotted lines. Fig. 5 is a perspective view of the demountable rim and tire detached. Fig. 6 is a perspective view of the wheel without the rim. Fig. 7 is a cross-section of the felly, felly band and demountable rim in assembled position. Fig. 8 is a plan view of part of the rim, showing one of its lugs. Fig. 9 is a plan view of part of the felly band showing one of its lugs. Fig. 10 is a perspective view of one of the felly band lugs. Fig. 11 is a perspective view of one form of tool for operating the combined positioning and locking mechanism.

The wheel may be of any usual or approved construction, and it is supplied with a felly 1, and a metal felly band 2, having the inside upstanding flange 3, as usual. This band may be secured to the felly in any suitable way. In accordance with my invention, this band is supplied with any number of radial lugs 4 transversely arranged, and having the inclined inner shoulders 5. These lugs preferably are spaced equidistantly apart.

The demountable rim 6 may be and is here shown of the clencher type, although the invention is not limited to any type of rim. This rim is provided with radial lugs 7, transversely arranged and preferably spaced equidistantly apart, and having the doubly-inclined shoulders 8 so as to provide for the use of the rim on either a right-hand or a left-hand wheel, and these lugs interlock with the lugs on the felly band, shoulder to shoulder, when the rim is turned forward, and in so doing draw the rim laterally into engagement with the vertical flange 3 of the felly band, to thereby aline the rim with the wheel and hold it against lateral displacement. Only the inclined shoulders of the lugs engage, and these lugs are not otherwise in contact with one another or with the felly band or rim. The demountable rim thus is, as it were, floated upon the wheel, and as results, there is no squeaking of the wheel in use; the liability of the parts sticking together by rust or otherwise is minimized if not wholly prevented, and the ready demounting of the rim not in the slightest interfered with.

The several lugs may be embossed or pressed in the felly band and rim, respectively, or they may be separately formed and then riveted or otherwise applied to these parts. In either case they may, and preferably do, run out thin or to nothing toward the outer edge of these parts, and their shoulders stand off from their parts at right angles or perpendicularly, and radially with relation thereto.

In order to apply and remove the rim, I provide a combined positioning and locking mechanism. One form of such mechanism consists of a cam member 9 having a boss 10 fitted in a hole 11 in the felly band which thereby serves as a bearing for the boss, and provided with a shank 12 extending through a hole 13 in the felly and through a hole or bearing in a face-plate 14 which is secured to the felly and preferably countersunk in it. The shank is encircled by a strong coiled spring 15 having its opposite ends secured to the boss 10 and face-plate 14, respectively, and tensioned to throw the cam normally in the direction of the circumference of the wheel. The hole 13 is enough larger than the spring to receive a quantity of hard lubricant or grease 16, indicated by the stippling in Fig. 3, to keep the parts lubricated, prevent rusting, and impede or prevent the entrance of moisture. The cam and its shank are held in place by a nut 17 on its inner end, and this nut may be locked to the shank in any suitable way, as by a pin 18 driven transversely through holes in the nut and shank.

The complemental rim members of this combined positioning and locking mechanism comprise the abutments 19 arranged reversely on opposite sides of the cam member, and like the lugs either made integral with the rim or separately formed and suitably fixed to the rim. Each abutment has a face 20 of arcuate form to coact with the cam face 21 of the cam member 9, so that as the cam member is released from its retracting agent the spring 15 will force the cam member into contact with the opposite abutment and force the rim forward and lock it in fixed position. In the reverse movement of the cam member, its longitudinal side 22 comes into contact with a projection or pin 23 on the rim and forces the rim in the opposite direction and thereby separates the lugs and so prepares the tire for demounting. The use of two abutments admits of using a rim either on a right-hand or a left-hand wheel. The cam member is located substantially in the middle of the felly band and when engaging the abutment the thrust is in a center line so as to avoid its displacement. The lugs take the thrust and traction in use, and are kept in engagement by the positioning and locking mechanism. When the wheel is reversed, as in backing, or stopping the car, this mechanism also holds the lugs in engagement and prevents their displacement.

A convenient tool for operating the combined positioning mechanism is shown in Fig. 11, same comprising a wrench-like device 24 having a handle 25 provided at one end with a socket 26 to engage the nut 17, and its other end 27 fashioned to serve as a tire tool. This device may be used to turn the cam device against the tension of its spring to release the rim, and also to aid the spring in coming into positioning and locking relation to the abutment in applying the rim to the wheel body.

The felly and felly band are provided with a radial slot 28 somewhat resembling a keyhole, through which the air-valve 31 on the demountable rim is passed in assembling the rim and demounting it, and this slot is of dimensions and length sufficient to permit forward movement of the rim in setting it upon the wheel. This slot 28 has its eye portion 29 inclined or tapered outwardly, as indicated by the dotted line Fig. 2, and as shown in Fig. 6 so as to be of larger diameter at the place where the air-valve enters and leaves it, to thereby serve as a guide for the insertion of the air-valve, and its parallel-sided portion 30 runs obliquely toward the flange 3 to receive and center the air-valve when the rim is properly mounted. Thus in mounting the rim it will be most convenient to turn the wheel so that its slot will be uppermost, and then the rim is inclined toward the flange and its air-valve inserted in the eye portion 29 of the slot, and then the rim is lowered onto the felly band with the air-valve alined with the portion 30 of the slot, ready for the forward movement imparted by the positioning and locking mechanism, upon action of which the air-valve is moved into the portion 30. Another function of this slot is that its use in connection with the air-valve brings all of the lugs into register, so as to insure their coöperation. Ordinarily there is placed a lock-washer on the air-valve next to the felly, and this requires the placing and displacing of the dust-cap and lock-washer every time the rim is removed or replaced. To obviate this inconvenience and by reason of the construction of rim herein shown, the lock-washer 32 is placed next to the rim, with packing 33 interposed, if desired, and a packing ring 34 placed at its outer face against which the dust-cap 35 is screwed in the shop and need not be removed until inflating is required. By thus using the lock-washer 32 not only is the manipulation of the dust-cap above criticized obviated, but incidentally and advantageously the entrance of water or moisture along the valve and into the tire, is prevented.

The operation would seem to be intelligible from the foregoing, but may be summarized as follows: For mounting or demounting, the wheel is turned until the air-valve is at the top. The wrench is then applied to the nut 17, and the cam member turned out of engagement with the abutment, and in this act of turning the cam member engages the pin 23, and forces the rim backward so as to disengage the lugs 4 and 7. The rim is now loose, and by pulling it away from the wheel body at the bottom and lifting it so as to take the air-valve out of the slot 28, in the felly and felly band, the rim is free to be demounted and disposed of as desired. To mount a rim, the air-valve is inserted in the slot 28 and the cam member turned at right angles to the felly and then the bottom of the rim pushed in until it engages the upstanding flange on the felly band, and then the rim and its tire are moved circumferentially, when the cam member is brought into engagement with its abutment and circumferential movement of the rim continued until the lugs interengage, and thus the rim is positioned and locked on the wheel.

Rims may and do vary more or less in diameter, but they are practically uniform on their parallel edges. In order to compensate for such variation, I arrange the rim lugs and the felly band lugs in such relation to a vertical plane parallel to the edges of the rim that these lugs will certainly engage effectively regardless of the variation in diameter.

It is within my invention as herein explained and claimed to vary the construction of parts and also their arrangement; for example, the angle of inclination of the shoulders of the lugs may be changed, and these lugs may be arranged with their interengaging shoulders located nearer the outer edges of the rim and band, but present use of the invention appears to demonstrate the practical utility of the arrangement shown, since by locating these shoulders as close as possible to the upstanding flange on the felly band, and so that the distance between the flange and the shoulders on the felly-band lugs is always less than the crest of the incline of the rim lugs, the engaging shoulders of the lugs compensate for any wear or inequalities and maintain constant engagement; there is no possibility of the lugs passing away from one another, and moreover any tendency to undue vibration is overcome, and further the wear and squeaking which accompanying such vibration are eliminated.

It is to be understood, further, that my invention admits of the use of any usual or approved form of split or side ring detachable, as well as any style of straight side or ordinary clencher rim.

Briefly summarized, the advantages of the present invention are quick and easy operation; simple construction; low cost of manufacture; durability; and neatness.

These advantages will appear from the following comparison of the patented invention with other well-known types in commercial use:—

First. By eliminating all bolts and fasteners which require a tedious mechanical adjustment, and substituting for them a system of self-interlocking elements, I reduce the time required for changing tires from many minutes to a few seconds.

Second. The lugs of the present invention may be pressed out of the body of the felly band and rim, at a minimum of manufacturing cost.

Third. These fastening elements being integral with the rim members and uniformly true to a plane of the wheel circumference, the proper alinement of the tire with the wheel is automatically secured, and this is impossible with prior constructions in which several individual mechanical adjustments are required. In the old-style rim excessive tightening of one bolt serves to throw the whole tire out of line and exposes it to excessive cross-strains and wear upon the tread.

Fourth. True circularity of the outer rim is now recognized as another essential to secure maximum tire service. By eliminating all wedges between the body of the demountable rim and the fixed rim, which tend to more or less distort the outer rim, this object is fully attained. Continuous circumferential support of the rim is afforded by the upstanding flange on the felly band, and while this is sufficient for all practical purposes, the transverse extension of the lugs on the felly band will serve to back up and prevent any possible inward distortion of the rim, due to excessive road shocks.

Fifth. The so-called "drivers", such as driving studs, and other devices, commonly attached to the rim members to prevent creeping of the rim upon the body of the wheel, are entirely unnecessary in my construction, inasmuch as my rim depends for its chief functioning upon a circumferential movement of the outer arm on the wheel body, the interengaging lugs taking the place of these drivers. Thus the tractive force that prior inventions seek to obviate or prevent is utilized in my invention in keeping the rim members in interlocking engagement.

Sixth. The self-acting and positive locking device which constitutes a part of the present invention, adjusts itself automatically to any possible movement of the rim members in their relation to one another, thereby always keeping the parts in close and positive engagement; lessening their tendency to wear, and also preventing squeaking and rattling due to imperfect adjustment.

Seventh. Much tedious labor is avoided by the means I provide for adjusting the lock-washer and dust-cap on the valve stem directly to the body of the demountable rim. In other constructions these elements are secured to the felly of the wheel which necessitates their removal and replacement every time the tire is mounted or demounted.

What I claim is:—

1. In a demountable rim structure, a demountable rim having transverse radial lugs provided with inclined perpendicular shoulders, and a felly band having an edge flange on its inner side and provided with complemental transverse radial lugs having inclined perpendicular shoulders to engage the shoulders on the rim lugs, the said felly band lugs having their inclined shoulders arranged adjacent to the flange with their point of closest approach less than the crest of the incline of the rim lugs and the two sets of lugs being engaged by a circumferential movement of the rim and when so engaged the inclined shoulders on the lugs serving to draw the rim to a seat on the flange, insure its concentricity with the wheel in its vertical plane and preclude the lateral and circumferential escape of the rim.

2. In a demountable rim structure, a demountable rim having transverse radial lugs provided with inclined perpendicular shoulders, and a felly band having an edge flange on its inner side and provided with complemental transverse radial lugs having inclined perpendicular shoulders to engage the shoulders on the rim lugs, the lugs on the rim and on the felly band being arranged to one side of the circumferential center line of the rim and felly band and the said felly band lugs having their inclined shoulders arranged in such proximity to the flange that the point of closest approach is less than the crest of the incline of the rim lugs, the two sets of lugs being engaged by a circumferential movement of the rim and when so engaged the inclined shoulders of the lugs serving to draw the rim laterally to a seat on the flange and prevent the escape of the rim lugs from the felly band lugs, and insure the concentricity of the rim with the wheel in its vertical plane.

3. In a demountable rim structure, a demountable rim having transverse radial lugs provided with inclined perpendicular shoulders, and a felly band having an edge flange on its inner side and provided with complemental transverse radial lugs having inclined perpendicular shoulders to engage the shoulders on the rim lugs, the lugs on the rim and on the felly band being arranged to one side of the circumferential center line of the rim and felly band and the said felly band lugs having their inclined shoulders facing the flange and forming therewith a convergent space whose narrowest end is of less width than the greatest width of the rim lugs so as to insure constant and unescapable engagement of the lugs and the seating of the rim against the flange.

4. In a demountable rim structure, a felly and a felly band provided with a slot one end of which is rounded and tapered inwardly and the other end extended in substantially parallel lines obliquely across the felly and felly band.

5. In a demountable rim structure, a felly and a felly band provided with sockets, and a rim-positioning and locking mechanism which consists of a cam member adapted to be rotated part way across the face of the felly band and provided with a boss seated in the socket in the felly band and a shank projecting through the socket in the felly and provided with fastening and engagement means by which it may be turned, and a spring acting upon the cam member to normally place it lengthwise of the felly band.

6. In a demountable rim structure, a felly and a felly band, provided with sockets and a rim positioning and locking mechanism consisting of a cam member adapted to be rotated part way across the face of the felly band and provided with a boss seated in the socket in the felly band and an operating member projecting through the socket in the felly, a face-plate on the inner face of the felly in which the outer end of the operating member has a bearing, fastening and engagement means for said operating member located outside the face-plate, and a spring arranged in the felly socket and having its opposite ends engaged with the boss and face-plate and set to normally move the cam member into a position lengthwise of the felly band.

7. In a demountable rim structure, a felly, and a felly band provided with an upstanding edge flange and transverse radially arranged lugs provided with obliquely disposed shoulders located between the upstanding flange and the longitudinal center of the felly band, a cam member having bearings in the felly and felly band, and means for automatically positioning the cam member in longitudinal alinement with the felly band.

8. In a demountable rim structure, a demountable rim having a series of transverse radial lugs, a felly, a felly-band having an edge flange on its inner edge and provided with complemental transverse radial lugs, the coaction of the lugs on the rim and felly band serving to draw the rim to a seat on the flange and insure its concentricity with the wheel in its vertical plane, and a combined rim positioning and locking mechanism including a cam member having bearings in the felly and felly-band and interposed between the rim and felly-band, an abutment on the rim against which the cam member acts to hold the lugs in engagement, and means for automatically positioning the cam member in longitudinal alinement with the rim.

9. In a demountable rim structure, a demountable rim having a series of transverse radial lugs, a felly, a felly-band having an edge flange on its inner edge and provided with complemental transverse radial lugs, the coaction of the lugs on the rim and felly-band serving to draw the rim to a seat on the flange and insure its concentricity with the wheel in its vertical plane, and a combined rim positioning and locking mechanism including a cam member having bearings in the felly and felly-band and interposed between the rim and felly-band, means for automatically positioning the cam member in longitudinal alinement with the rim, an abutment on the rim with which the cam member coacts in holding the lugs in engagement, and a projection on the rim interposed in the path of reverse movement of the cam member and engaged by said member to facilitate the disengagement of the lugs in the demounting of the rim.

In testimony whereof I have hereunto set my hand this 13th day of September A. D. 1916.

IRA D. WALTER.

Witnesses:
WM. H. FINCKEL,
W. H. FINCKEL, Jr.